(12) United States Patent  
Wasser et al.

(10) Patent No.: US 8,882,168 B2  
(45) Date of Patent: Nov. 11, 2014

(54) TAILGATE ROD

(71) Applicants: Jacob Ivan Wasser, Dublin, OH (US); Makoto Watanabe, Dublin, OH (US); Travis Lonas, Marysville, OH (US)

(72) Inventors: Jacob Ivan Wasser, Dublin, OH (US); Makoto Watanabe, Dublin, OH (US); Travis Lonas, Marysville, OH (US)

(73) Assignee: Honda Motor Co., Ltd., Tokyo (JP)

( * ) Notice: Subject to any disclaimer, the term of this patent is extended or adjusted under 35 U.S.C. 154(b) by 0 days.

(21) Appl. No.: 13/834,654

(22) Filed: Mar. 15, 2013

(65) Prior Publication Data

US 2014/0265415 A1  Sep. 18, 2014

(51) Int. Cl.
*B62D 33/027* (2006.01)
*B60J 5/10* (2006.01)

(52) U.S. Cl.
CPC . *B60J 5/107* (2013.01); *B60J 5/106* (2013.01)
USPC ............ 296/56; 296/106; 296/146.8; 49/324; 49/334

(58) Field of Classification Search
CPC ....................................................... B06J 5/101
USPC ............ 296/56, 106, 146.8; 49/324, 334, 340
See application file for complete search history.

(56) References Cited

U.S. PATENT DOCUMENTS

| 2,769,659 | A | * | 11/1956 | Schubert et al. | 296/106 |
|---|---|---|---|---|---|
| 3,713,472 | A | | 1/1973 | Dozois | |
| 3,716,945 | A | | 2/1973 | Cooper et al. | |
| 6,018,912 | A | * | 2/2000 | Baughman et al. | 49/386 |
| 6,767,048 | B2 | | 7/2004 | Yokota | |
| 7,121,043 | B2 | | 10/2006 | Yokota | |
| 7,156,450 | B2 | * | 1/2007 | McIntyre et al. | 296/146.8 |
| 7,837,252 | B2 | * | 11/2010 | Etou et al. | 296/146.4 |
| 7,866,728 | B2 | * | 1/2011 | Suzuki | 296/146.4 |
| 2006/0261634 | A1 | * | 11/2006 | McIntyre et al. | 296/146.8 |
| 2007/0057532 | A1 | * | 3/2007 | McIntyre et al. | 296/146.8 |

FOREIGN PATENT DOCUMENTS

JP    2001047862    2/2001

OTHER PUBLICATIONS

JP2001047862—English translation, Feb. 20, 2001.

* cited by examiner

*Primary Examiner* — Lori Lyjak
(74) *Attorney, Agent, or Firm* — Fay Sharpe LLP

(57) ABSTRACT

A tailgate for an associated automotive vehicle. The tailgate is coupled via a rod to a motor. The tailgate includes a frame having a point of attachment to the rod. The rod passes through an opening in the vehicle body. The rod has a longitudinal axis that travels in a substantially linear axial direction in the region passing through the opening when the tailgate moves from a closed to an open position and vice versa.

20 Claims, 6 Drawing Sheets

TAILGATE ROD

BACKGROUND

The present disclosure relates generally to a tailgate assembly of an automotive vehicle. In particular, it relates to the tailgate rod component of the tailgate assembly.

The advantages of providing a vehicle, such as a van or sport utility, with a tailgate for cargo access have been recognized for many years. Moreover, these vehicles provide rear storage compartments which can be accessed to receive large items via a lift-gate that opens substantially the entire rear of the vehicle.

A lift-gate that swings upward about a horizontal axis to open can require significant lifting force to effect opening. For the convenience of the person using a vehicle having a lift type tailgate, it may be desired that a power lift system be provided to reduce the required lifting effort, particularly where the tailgate is a heavy singular gate or door that closes the entire rear access opening. Similarly, it may be desirable to provide a fully automated lift type tailgate assembly.

Various forms of power lift-gate systems have been proposed. Typically, they include a motor configured to drive a rod which is connected to the tailgate. More particularly, the lift type tailgate is connected to a motor provided in a vehicle compartment with a connection rod, and opening/closing of the tailgate is assisted and/or automatically driven by the motor. The motor can be located on an interior surface of a rear pillar and covered by a pillar garnish adapted to cover the surface of the rear pillar. The connection rod projects from the motor rearwardly via an opening formed in the pillar garnish and attaches to the tailgate so as to move generally diagonally upwardly and downwardly. Typically, the connection is made between a socket portion of the connection rod and a post secured to the tailgate. In this manner, a rotatable connection is formed to allow a change in orientation throughout the opening-closing process. It may be advantageous to limit axial movement of the connection rod to allow the opening in the pillar garnish to be as small as possible.

SUMMARY OF THE DISCLOSURE

Various details of the present disclosure are hereinafter summarized to provide a basic understanding. This summary is not an extensive overview of the disclosure, and is intended neither to identify specific elements of the disclosure, nor to delineate the scope thereof. Rather, the primary purpose of this summary is to present some concepts of the disclosure in a simplified form prior to the more detailed description that is presented hereinafter.

According to one embodiment, a tailgate for an automotive vehicle is provided. The tailgate is coupled via a rod to a motor to open and close the tailgate. The rod includes a tailgate attachment end and a motor attachment end. A first bend is provided adjacent the tailgate attachment end and a second bend is provided adjacent the motor attachment end.

According to a further embodiment, a tailgate for an associated automotive vehicle is provided. The tailgate is coupled via a rod to a motor. The tailgate includes a frame having a point of attachment to the rod. The rod passes through an opening in the vehicle body. The rod has a longitudinal axis that travels in a substantially linear axial direction in the region passing through the opening when the tailgate moves from a closed to an open position.

According to an additional embodiment, an actuating device to open and close a member of a vehicle is provided. The member is pivotally mounted to an edge of an opening of said vehicle with a hinge. The actuating device comprises a motor disposed on a body pillar located on a side edge of the opening. A connecting rod connects at a first end to the member and at a second end to the motor. The connecting rod is provided with a first bent portion adjacent the first end and a second bent portion adjacent the second end.

BRIEF DESCRIPTION OF THE DRAWINGS

The following description and drawings set forth certain illustrative implementations of the disclosure in detail, which are indicative of several exemplary ways in which the various principles of the disclosure may be carried out. The illustrated examples, however, are not exhaustive of the many possible embodiments of the disclosure. Other objects, advantages and novel features of the disclosure will be set forth in the following detailed description of the disclosure when considered in conjunction with the drawings, in which.

DETAILED DESCRIPTION

Figure 1:
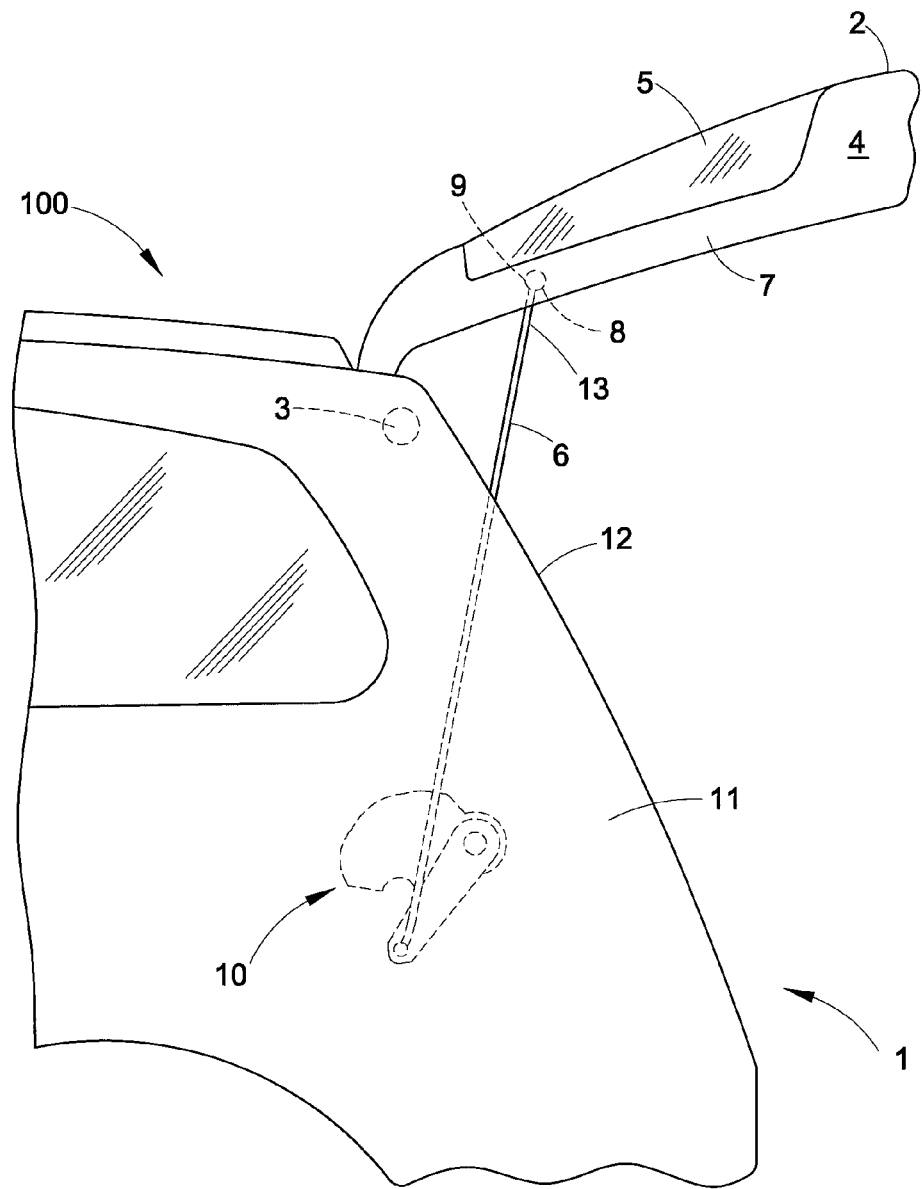
FIG. 1 is a limited illustration of a motor vehicle (partially in phantom) including a power tailgate actuating assembly.

One or more embodiments or implementations are hereinafter described in conjunction with the drawings, where like reference numerals are used to refer to like elements throughout, and where the various features are not necessarily drawn to scale.

Figure 2:
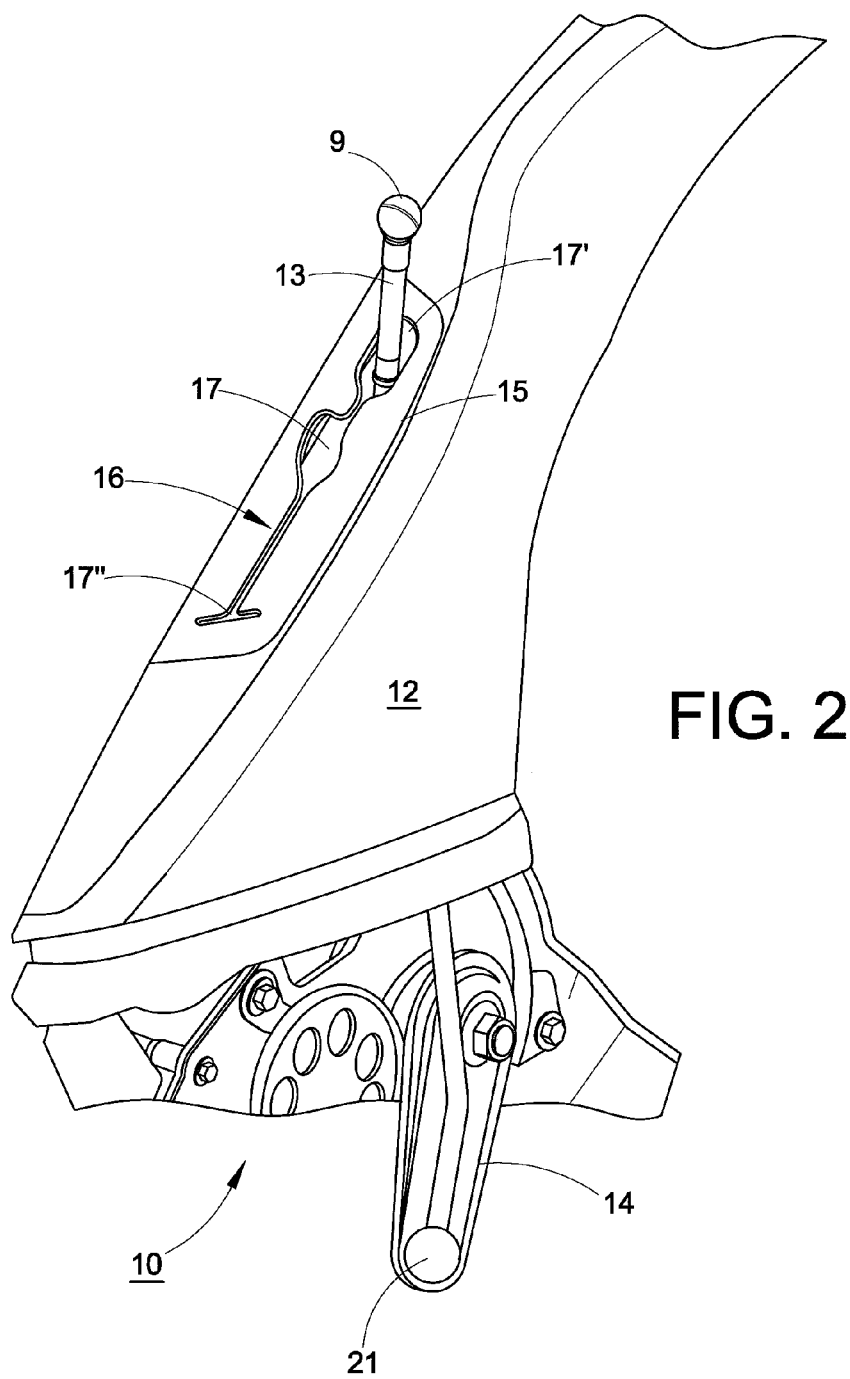
FIG. 2 is a rear perspective view of a power tailgate actuating assembly of an automotive vehicle with a portion of a rear pillar garnish removed.
Figure 3:
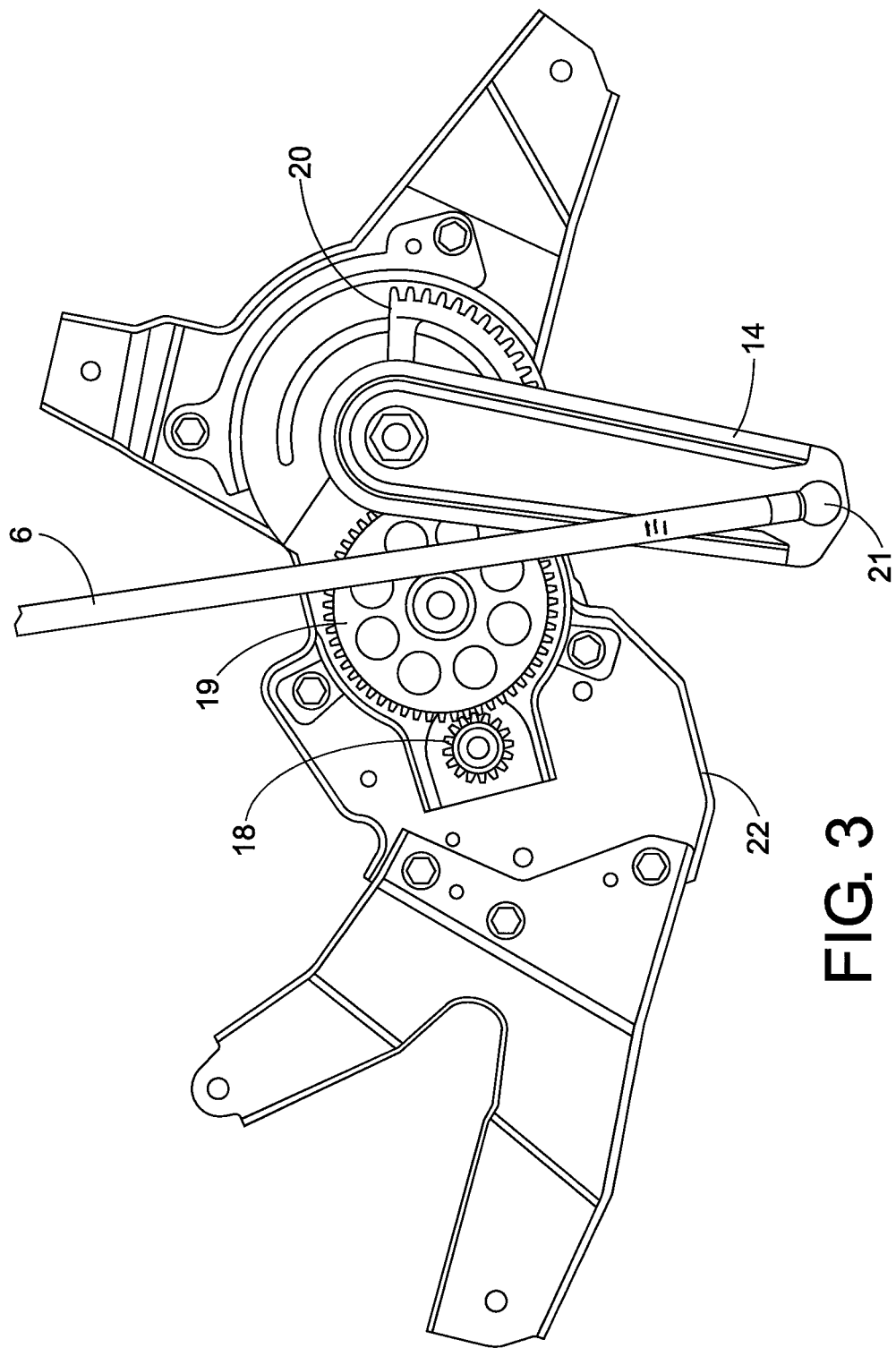
FIG. 3 is a side elevation view of the motor assembly of FIG. 2.

With reference to FIGS. 1, 2 and 3, a motor vehicle 100 includes a back opening 1 that can be sealed with a back door 2. An upper portion of the back door 2 is pivotally connected to a corresponding upper portion of the vehicle body through respective aligned hinge units 3. Thus, the back door 2 is able to pivot about a common axis of the hinge units 3 between a full-close position and the full-open position that is shown.

Tailgate 2 is comprised of a metal body 4 surrounding a window 5. A connection rod 6 is secured to an inner peripheral surface of the door frame 7. More particularly, the connection rod 6 is secured to a post 8 mounted to the inner peripheral surface of the door frame 7 via a ball socket 9.

Garnish elements may be employed to cover the door frame 7. However, the door garnish elements can include an opening suitable for accommodating passage of connection rod 6 in a location corresponding to the post or passage of the post itself.

A motor 10 is secured to an interior surface of a rear pillar 11 and is concealed within a rear pillar garnish 12 (the pillar garnish adjacent the motor has been removed in FIG. 2 for illustrative purposes). A projecting end 13 of rod connection 6 extends outside of rear pillar garnish 12.

The connection rod 6 is further secured to a turn arm 14 which is driven by motor 10 to provide selective upward and downward travel of connection rod 6 and an associated generally forward and backward travel of connection rod 6 (based on the vehicle orientation). Moreover, the connection rod 6 is oriented such that when the motor 10 is driven, the turn arm 14 drives the connection rod 16 either rearward and diagonally upwards (opening the tailgate 2) or forward and diagonally downwards (closing the tailgate 2).

Rear pillar garnish 12 overlies the rear pillar 11. The rear pillar garnish 12 attaches to the rear pillar 11 to provide a protective cover for the power tailgate motor 10 and a portion of connection rod 6. The rear pillar garnish 12 includes an opening 15 which receives a cover 16. Cover 16 allows connection rod 6 (including the projecting end 13 terminating in ball socket 9) to pass through the rear pillar garnish 12 via passage 17. Connection rod 6 travels vertically and horizontally during the opening-closing of tailgate 2. Accordingly, in a tailgate closed condition, connection rod 6 can have its largest extent contained within garnish 12 and will be disposed at a first end 17' of passage 17. During the transition to a tailgate fully open condition, connection rod 6 can travel to a second end 17" of passage 17 as turn arm 14 reaches its furthermost rearward position.

As best shown in FIG. 3, the motor 10 includes a drive gear 18 rotated by the electric motor 10 (not seen in FIG. 3). Drive gear 18 in turn drives speed reduction gear 19 which drives sector gear 20. Connection rod 6 is secured to a post (not shown) on turn arm 14 via a ball socket 21. Sector gear 20 rotates the turn arm 14 through a selected quadrant. A cover 22 overlays motor 10, receives the speed reduction gear 19, sector gear 20 and turn arm 14 and further secures the motor assembly to the rear pillar 11. Accordingly, when the electric motor 10 is energized, the turn arm 14 is rotated in the direction of the arrow (to open the tailgate) and the connection rod 6 moved generally upward. Closing of the tailgate would be accomplished by the reverse rotation of the motor assembly components.

Figure 4:
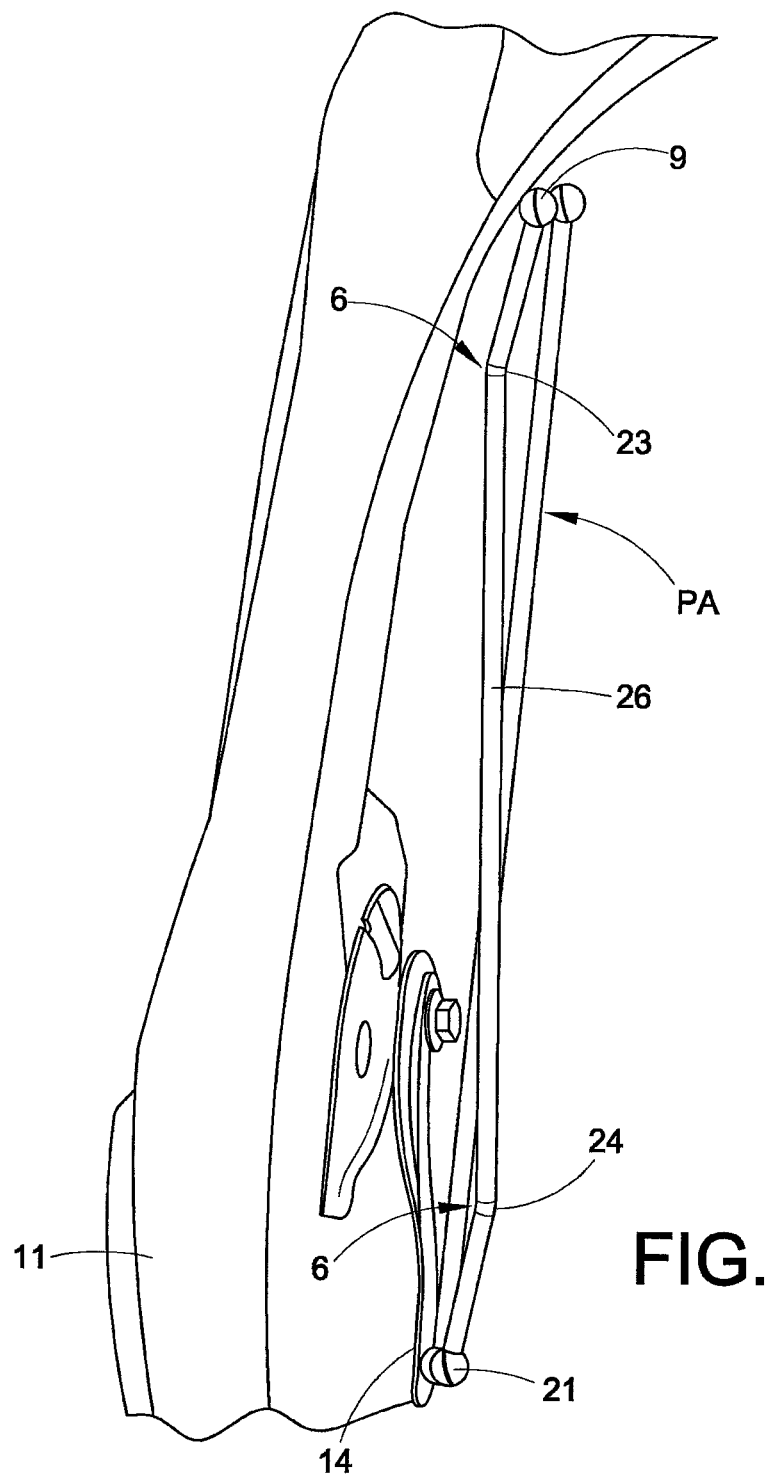
FIG. 4 is a rear view of a rear pillar including a power tailgate actuating assembly illustrating a bent versus straight tailgate connection rod.

With reference to FIG. 4, a bent connection rod 6 in accord with an exemplary embodiment is depicted side by side to a prior art straight rod PA. More particularly, connection rod 6 includes a first bend 23 adjacent to ball socket 9 and a second bend 24 adjacent to ball socket 21. Connection rod 6 includes a straight section 26 extending between first bend 23 and second bend 24. Straight section 26 may generally comprise the greatest length of the connection rod. Straight section 26 can be the segment of connection rod 6 which travels through the passage 17. Moreover, bend 23 can be flush with or be extended outwardly from the passage 17 in a tailgate door 2 closed condition.

As illustrated, bend 24 is generally in a direction toward the exterior of the vehicle relative to the longitudinal axis of the straight section 26, while bend 23 is generally in the direction of the interior of the vehicle relative to the longitudinal axis of straight section 26. Bend 23 and bend 24 can be of substantially the same degree. It is envisioned that a bend angle of between about 5 and 30° may be suitable for most vehicle designs. However, numerous bend configurations are believed to be suitable depending on the orientation between the drive arm and the juncture with the tailgate Referring now to FIG. 5, the vertical and horizontal travel of connection rod 6 is depicted. Moreover, at closed position C, turn arm 14 and accordingly connection rod 6 position the tailgate along imaginary line 25 (closed). Rotation of turn arm 14 through the various illustrated positions results in a location of connection rod 6 in a fully opened condition O wherein connection rod 6 has traveled both horizontally and vertically to a position where an imaginary line 26 represents the position of the tailgate (fully open).

Figure 5:
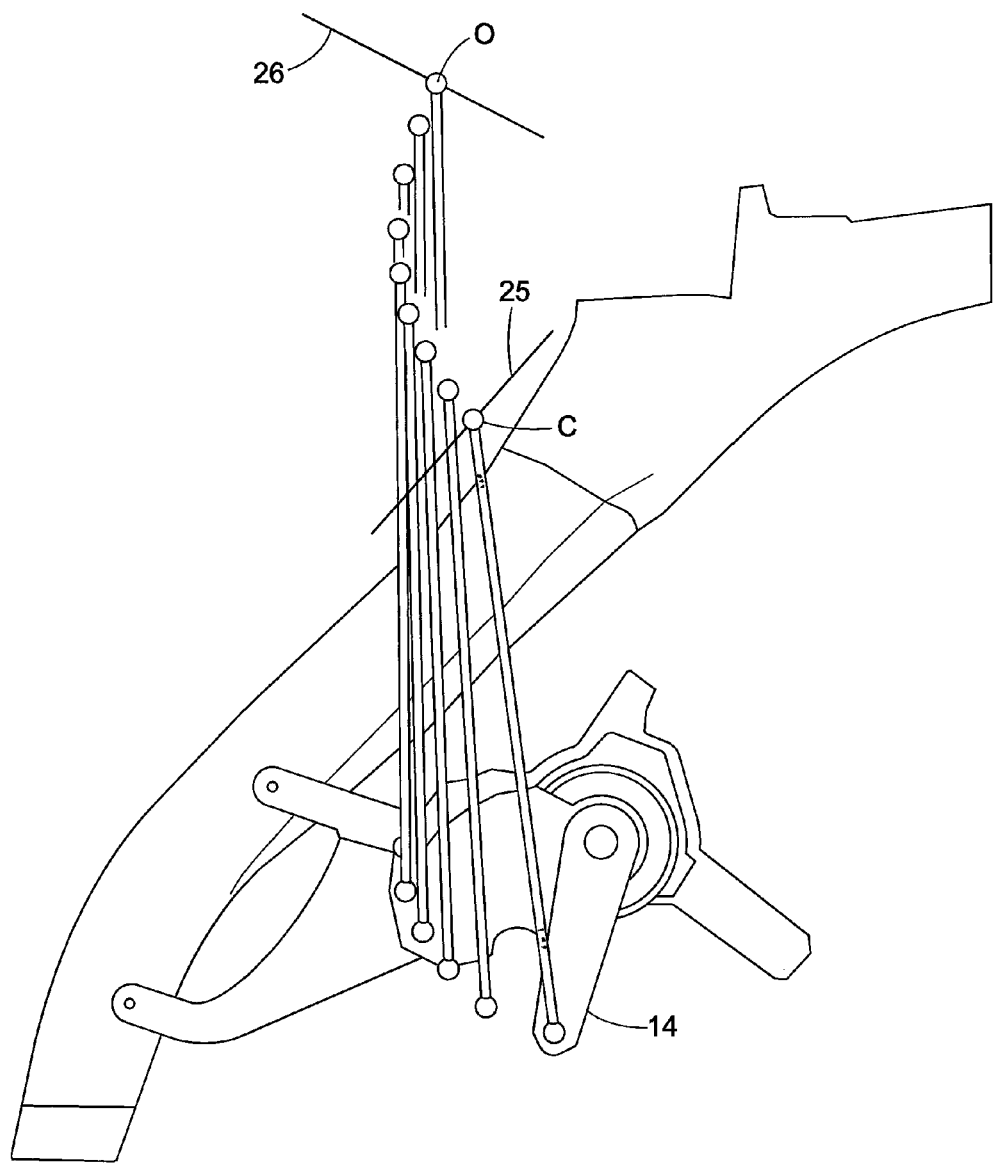
FIG. 5 is a side view of the power tailgate rod assembly of FIG. 4 demonstrating the vertical and horizontal travel of the tailgate connection rod.
Figure 6:
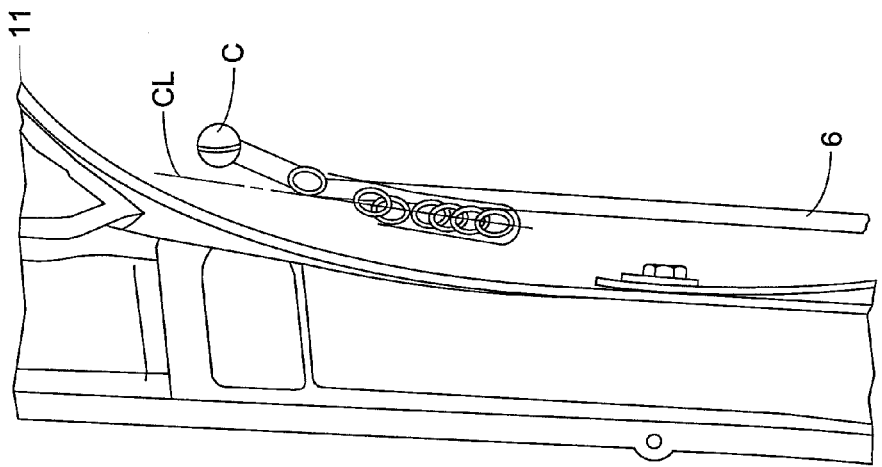
FIG. 6 is a rear comparison view of the straight (left side) and bent (right side) tailgate connection rods of FIG. 4 demonstrating the relative axial displacement of each.
Figure 6:
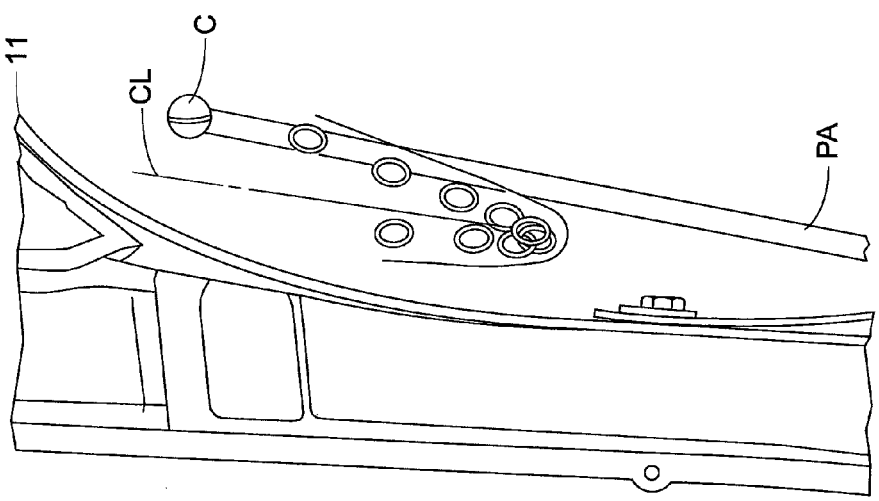

Turning next to FIG. 6, the advantageous limiting of axial motion of connection rod 6 resulting from its unique configuration is depicted. More particularly, the positions illustrated in FIG. 5 are reflected in the corresponding axial travel of the straight connection rod PA and connection rod 6. As shown, connection rod 6 demonstrates limited axial movement throughout the rotation of turn arm 14. In contrast, the straight rod PA demonstrates significantly greater axial displacement throughout the translation between opened and closed or closed and open. For example, by establishing a center line "CL" of axial travel for straight connection rod PA and connection rod 6, wherein the CL bisects the positions of the rod in the region in which it passes through the vehicle body, it can be seen that connection rod 6 deviates from the linear CL insubstantially (for example, less than 5° or even 2°). In contrast, the straight connection rod PA demonstrates a total deviation from the CL by in excess of 20°. By adjusting the geometry of the rod, the skilled artisan can adjust and control the path of the rod. In the specific embodiment depicted above, the path can be modified from a V-shape path to a linear path that follows the tailgate weather strip flange and improves the packaging and tailgate opening size.

Advantageously, reduction in axial travel of connection rod 6 allows passage 15 in garnish 12 to be reduced in size and similarly allows passage 17 and cover 16 to be reduced in size and/or shape complexity. Each of these advantageous reductions in size provide aesthetic and functional benefits while maintaining a full range of motion for the rod during tailgate stroke.

In accordance with the present embodiment, an improved appearance to the passage for the tailgate rod in the tailgate garnish can be achieved. The design also minimizes the accessibility (visually and physically) to the internal mechanisms.

The above examples are merely illustrative of several possible embodiments of various aspects of the present disclosure, wherein equivalent alterations and/or modifications will occur to others skilled in the art upon reading and understanding this specification and the annexed drawings. In particular regard to the various functions performed by the above described components (assemblies, devices, systems, and the like), the terms (including a reference to a "means") used to describe such components are intended to correspond, unless otherwise indicated, to any component which performs the specified function of the described component (i.e., that is functionally equivalent), even though not structurally equivalent to the disclosed structure which performs the function in the illustrated implementations of the disclosure. In addition, although a particular feature of the disclosure may have been illustrated and/or described with respect to only one of several implementations, such feature may be combined with one or more other features of the other implementations as may be desired and advantageous for any given or particular application. Also, to the extent that the terms "including", "includes", "having", "has", "with", or variants thereof are used in the detailed description and/or in the claims, such terms are intended to be inclusive in a manner similar to the term "comprising".

We claim:

1. A tailgate for an associated automotive vehicle, said tailgate coupled via a rod to a motor provided within said automotive vehicle to open and close the tailgate, the tailgate comprises a frame including a point of attachment to said rod, said rod includes a tailgate attachment end and a motor attachment end, said rod including a first bend adjacent the tailgate attachment end and a second bend adjacent the motor attachment end.

2. The tailgate of claim 1 wherein said rod includes a first straight region between said first bend and the second bend.

3. The tailgate of claim 1 wherein said rod is straight between said first bend and said tailgate attachment end and straight between said second bend and said motor attached end.

4. The tailgate of claim 2 wherein said bends are of a substantially equal extent relative to a longitudinal axis of the first straight region.

5. The tailgate of claim 1 wherein said first bend and said second bend are in opposite directions.

6. The tailgate of claim 2 wherein said first straight region comprises the greatest length of the rod.

7. The tailgate of claim 1 wherein said tailgate attachment end and said motor attachment ends comprise ball sockets.

8. The tailgate of claim 1 wherein said motor is connected to said rod via an intermediate drive arm and said drive arm is rotated by a sector gear.

9. The tailgate of claim 1 wherein said first bend is in a direction of an interior of said vehicle and said second bend is in a direction of an exterior of said vehicle.

10. A tailgate for an associated automotive vehicle, said tailgate coupled via a rod to a motor provided within said associated automotive vehicle to open and close the tailgate, the tailgate including a point of attachment to said rod, said rod including a region passing through an opening in the vehicle body, wherein said rod has a longitudinal axis and said longitudinal axis of said rod in said region travels in a substantially linear axial direction between a tailgate closed and a tailgate open position.

11. The tailgate of claim 10 wherein said rod is attached to a lever arm, said lever arm being rotated by a sector gear in communication with the motor.

12. The tailgate of claim 10 wherein said vehicle body comprises a rear pillar garnish.

13. The tailgate of claim 10 wherein said rod includes at least two bent areas.

14. The tailgate of claim 10 wherein said longitudinal axis of said rod in said region departs from said linear axial direction of travel by less than 5°.

15. An actuating device to open and close a member of a vehicle which is pivotally mounted to an edge of an opening of said vehicle with a hinge, said actuating device comprising: a motor disposed on a body pillar located on a side edge of said opening; and a connecting rod which is connected at a first end to said member and at a second end to said motor; wherein said connecting rod is provided with a first bent portion adjacent the first end and a second bent portion adjacent the second end.

16. The actuating device of claim 15 wherein each of the first and second bent portions comprise an angle of between 5 and 30°.

17. The actuating device of claim 15 wherein said first bent portion is in a direction of an interior of said vehicle and said second bent portion is in a direction of an exterior of said vehicle.

18. The actuating device of claim 15 wherein said connecting rod is attached to a lever arm, said lever arm being rotated by a sector gear in communication with the motor.

19. The actuating device of claim 15 wherein said member comprises a tailgate.

20. The actuating device of claim 18 wherein a region of said connecting rod intermediate said first bent portion and said second bent portion demonstrates substantially linear axial motion when said lever arm is rotated.

* * * * *